United States Patent [19]
Williams et al.

[11] Patent Number: 6,113,031
[45] Date of Patent: Sep. 5, 2000

[54] CARGO BIN ASSEMBLY FOR USE IN A HELICOPTER CARGO HOLD

[75] Inventors: James D. Williams, Meriden; Philip J. Toothill, Naugatuck, both of Conn.

[73] Assignee: Sikorsky Aircraft Corporation, Stratford, Conn.

[21] Appl. No.: 09/188,521

[22] Filed: Nov. 9, 1998

[51] Int. Cl.[7] .............................. B64C 1/20; B65D 88/00; B65D 6/00
[52] U.S. Cl. .............................. 244/118.1; 220/1.5; 220/4
[58] Field of Search .............................. 244/118.1, 137.1; 220/1.5; 108/44; 195/35

[56] References Cited

U.S. PATENT DOCUMENTS

| | | | |
|---|---|---|---|
| 2,564,940 | 8/1951 | Weber | 217/60 R |
| 3,294,034 | 12/1966 | Bodenheimer et al. | 220/1.5 |
| 4,221,302 | 9/1980 | Kupersmit | 220/4 |
| 5,090,335 | 2/1992 | Russell | 108/44 |
| 5,533,604 | 7/1996 | Brierton | 193/35 |
| 5,921,420 | 7/1999 | Gordon et al. | 220/1.5 |

*Primary Examiner*—Peter M. Poon
*Assistant Examiner*—Francis T. Palo
*Attorney, Agent, or Firm*—William W. Jones

[57] ABSTRACT

A helicopter, or other aircraft, cargo bin is sized and configured so as to closely match the size and configuration of a closed cargo hold in the aircraft. The cargo bin is provided with a cover that is formed from a flame-retardant fabric which can be folded forwardly to open the top of the cargo bin, whereby the open bin can be positioned on a hydraulic ramp in the cargo hold before or after the bin is filled with cargo. The bin also has a hinged back wall which can be partially folded downwardly so as to open the upper portion of the back wall while keeping the lower portion of the back wall closed. This allows luggage or the like to be placed in the bin, when the bin is in the cargo hold, through the upper open portion of the bin, while enabling the lower closed portion of the bin to prevent the inserted luggage from sliding out of the bin. The lower portion of the back wall of the bin is disposed in open ended channels attached to side walls of the bin so that the back wall can be slid out of the channels to open the entire back of the bin so as allow larger items to be inserted into the bin through the open back when the bin is positioned in the cargo hold. The inner surface of the bottom wall or floor of the bin may also be provided with rotatable rollers which allow bulky cargo to be easily slid into the bin while the bin is disposed in the cargo hold of the aircraft. The bin is light in weight so that, when empty, it can easily be inserted into the cargo hold by one person prior to being filled with cargo. The outer surface of the bottom wall or floor of the bin can also be provided with rollers so that a pre-filled bin can be slid into the cargo hold of the aircraft.

5 Claims, 4 Drawing Sheets

# CARGO BIN ASSEMBLY FOR USE IN A HELICOPTER CARGO HOLD

TECHNICAL FIELD

This invention relates to an improved cargo bin assembly which is specifically adapted for use in the cargo hold of a helicopter, or other aircraft. More particularly, this invention relates to a cargo bin which is adapted to contain passenger luggage, and also more bulky cargo, and which is easily loaded with either form of cargo when the bin is disposed in the cargo hold of the aircraft. The bin can also be loaded with cargo outside of the cargo hold, and easily placed in the cargo hold or removed therefrom. When the bin is removed from the cargo hold, the hold may be opened into the remainder of the aircraft cabin so that entire cabin can be filled with cargo via the cargo hold opening.

BACKGROUND ART

Helicopters have been widely used by the military, and also by civilians, for personnel and cargo transportation. Civilian use of helicopters to transport personnel also involves transportation of luggage and other personal belongings of the individuals on the aircraft. Helicopters are also used to transport cargo to rather isolated locations such as offshore oil drilling platforms, and other destinations which cannot accommodate more conventional aircraft.

Up to the present time, very little thought has been given to simplifying the transportation of cargo in a helicopter. Cargo space on the aircraft is relatively poorly designed and difficult to use. It would be desirable to provide an improved cargo-carrying device for use in a helicopter.

DISCLOSURE OF THE INVENTION

This invention relates to a cargo bin assembly for use with a helicopter. More particularly, this invention relates to a cargo bin assembly which can be filled with cargo when the bin is positioned on or off of the loading ramp of the cargo hold of the helicopter. The bin assembly is configured so as to match the configuration of the cargo hold and its loading ramp, and includes a soft cover which can be peeled forward into the cargo hold when the bin is positioned on the loading ramp of the cargo hold. The bin can be opened when the bin is positioned on the cargo hold loading ramp of the helicopter. The front, bottom and side walls of the bin are rigid, and the back wall is removably mounted in a pair of channels which are mounted on the back ends of the side walls of the bin.

It should be noted that the term "front" as used herein to describe a wall of the cargo bin corresponds to the wall which is disposed inside of the aircraft when the cargo hold is open; and the term "back" is used herein to describe a wall of the cargo bin corresponds to the wall which is accessible via the loading ramp of the cargo hold in which the bin is disposed. The back wall has a horizontal medial hinge joint which allows an upper half of the back wall to be opened up when the bin is in the helicopter cargo hold. The back wall can also be lifted out of the channels so as to open the entire back of the bin when the bin is in the helicopter cargo hold. One embodiment of the bin is provided with parallel sets of rotating rollers mounted in the inner surface of the bottom wall or floor of the bin. The rollers inside of the bin allow one person to slide heavy cargo into the bin when the latter is positioned in the cargo hold, or outside of the cargo hold, without requiring another person's assistance. The bin may be provided with parallel sets of rollers on the outside surface of the bottom wall of the bin. The latter sets of rollers allow one to easily push a filled bin into the cargo hold of the aircraft. After the bin has been filled with cargo, the soft top can be peeled backwardly down into place and strapped to the walls of the bin. The top of the bin is preferably formed from a flame retardant material such as "NOMEX" trim cloth.

It is therefore an object of this invention to provide an improved cargo bin assembly for use in the cargo hold of a helicopter.

It is an additional object of this invention to provide a cargo bin assembly of the character described which includes a cargo bin that is configured so as to match the configuration of the cargo hold of the helicopter.

It is a further object of this invention to provide a cargo bin assembly of the character described wherein the bin can be opened and filled with cargo while position on the loading ramp of the cargo hold in the helicopter.

It is another object of this invention to provide a cargo bin assembly of the character described wherein the bin has a rigid back wall which can be partially or completely opened when the bin is on the cargo hold loading ramp.

It is yet another object of this invention to provide a cargo bin assembly of the character described wherein the inside of the floor of the bin is provided with rollers which allow heavy cargo to be slid into the bin when the latter is positioned on the loading ramp of the cargo hold of the helicopter.

It is a further object of this invention to provide a cargo bin assembly of the character described wherein the outside of the floor of the bin is provided with rollers which allow a filled cargo bin to be slid relatively easily into the cargo hold of the aircraft.

BRIEF DESCRIPTION OF THE DRAWINGS

These and other objects and advantages of the invention will become more readily apparent from the following detailed description of an embodiment of the invention when taken in conjunction with the accompanying drawings in which.

DETAILED MODE FOR CARRYING OUT THE INVENTION

Figure 1:
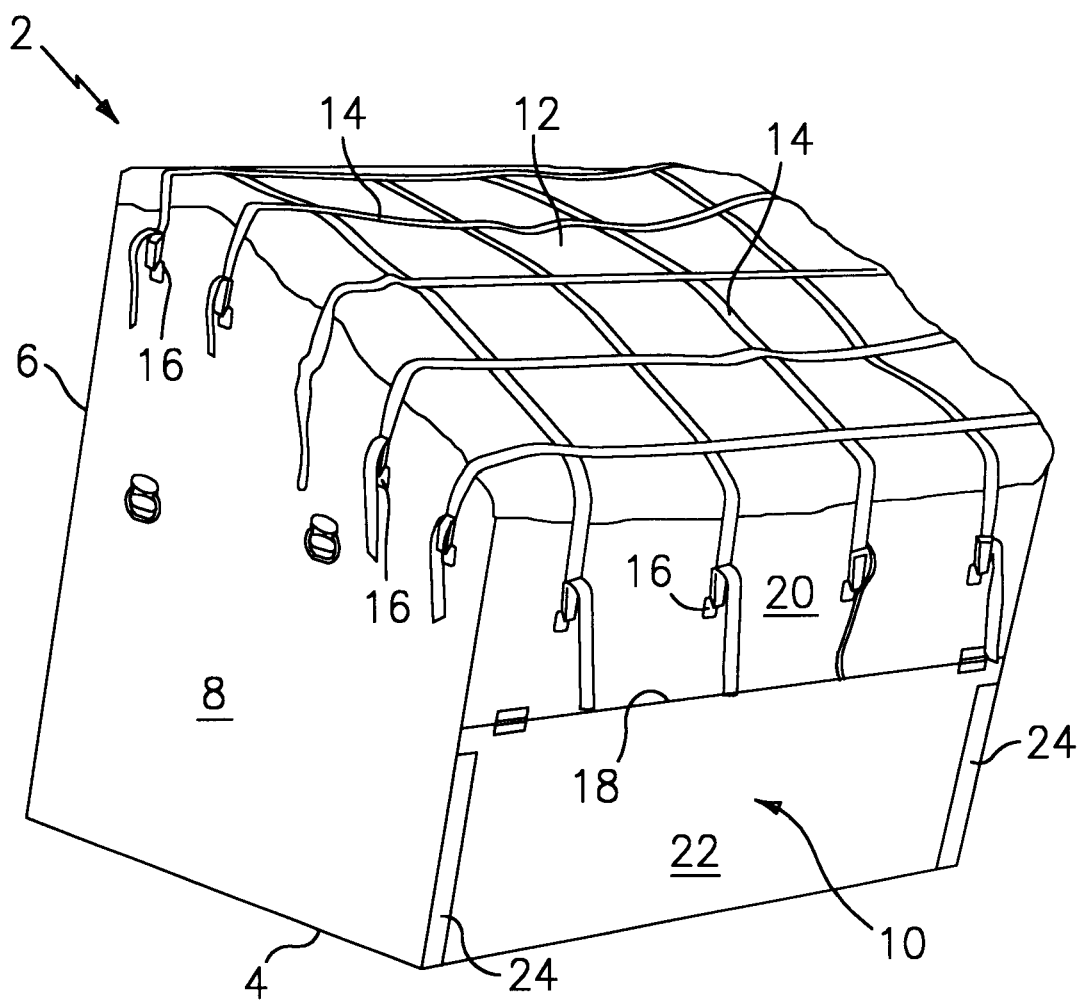
FIG. 1 is a perspective view of one embodiment of a cargo bin which is formed in accordance with this invention.

Referring now to the drawings, FIG. 1 shows a preferred embodiment of a cargo bin which is denoted generally by the numeral 2 and which is formed in accordance with this invention. The bin 2 includes a rigid bottom wall or floor 4, a rigid front wall 6, rigid side walls 8, and a rigid back wall 10. The top of the bin 2 is formed from a soft material 12 which covers the upper portion of the bin 2 and which is held in place by a plurality of straps 14. The straps 14 are releasably secured to the front, side and back walls 6, 8 and 10 respectively, by buckles 16 or the like, which are secured to the bin walls. The back wall 10 includes a transverse hinge line 18 whereby an upper section 20 of the wall 10 can be pivoted downwardly over a lower section 22 of the wall 10. The lower section 22 of the wall 10 is telescoped into a pair of side channels 24 which are secured to the inside surface of the side walls 8, whereby the back wall 10 can be lifted out of the channels 24 and disconnected from the remainder of the bin 2. When not filled with cargo, the bin 2 is light in weight, and weighs approximately sixty pounds. Thus an empty bin can be easily maneuvered into place onto the loading ramp of the cargo hold of a helicopter by one person. The bin 2, once placed on the loading ramp is held in place thereon by suitable releasable fasteners on the bin and ramp.

Figure 2:
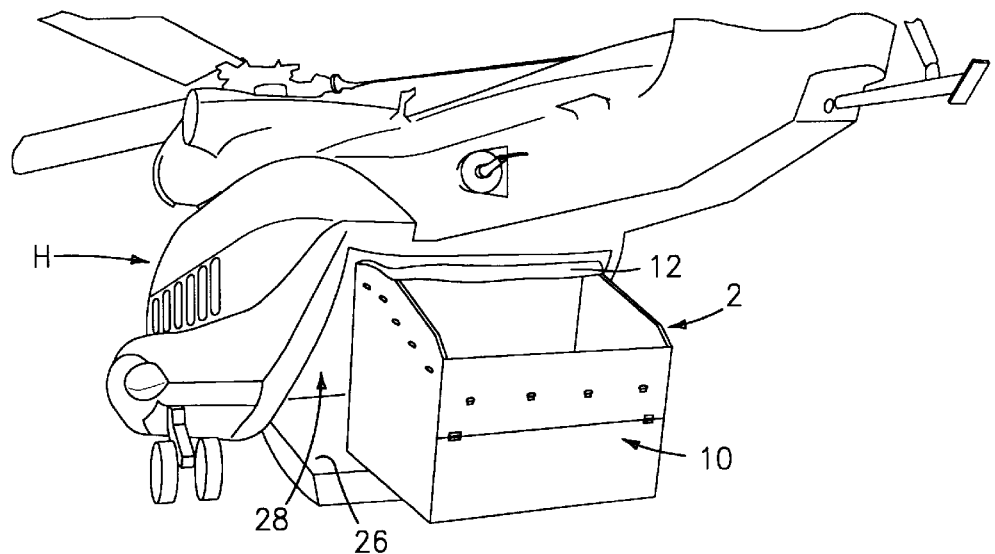
FIG. 2 is a perspective view of the bin of FIG. 1 shown positioned on the loading ramp of the cargo hold of a helicopter.
Figure 3:
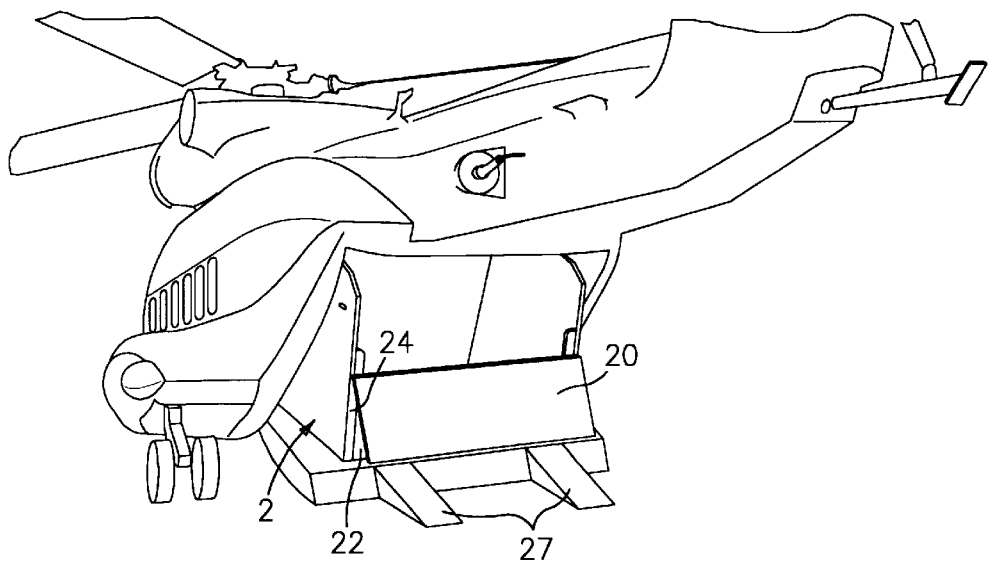
FIG. 3 is a perspective view similar to FIG. 2, but showing the bin with its back wall hinged downwardly so as to open the upper end of the bin.
Figure 4:
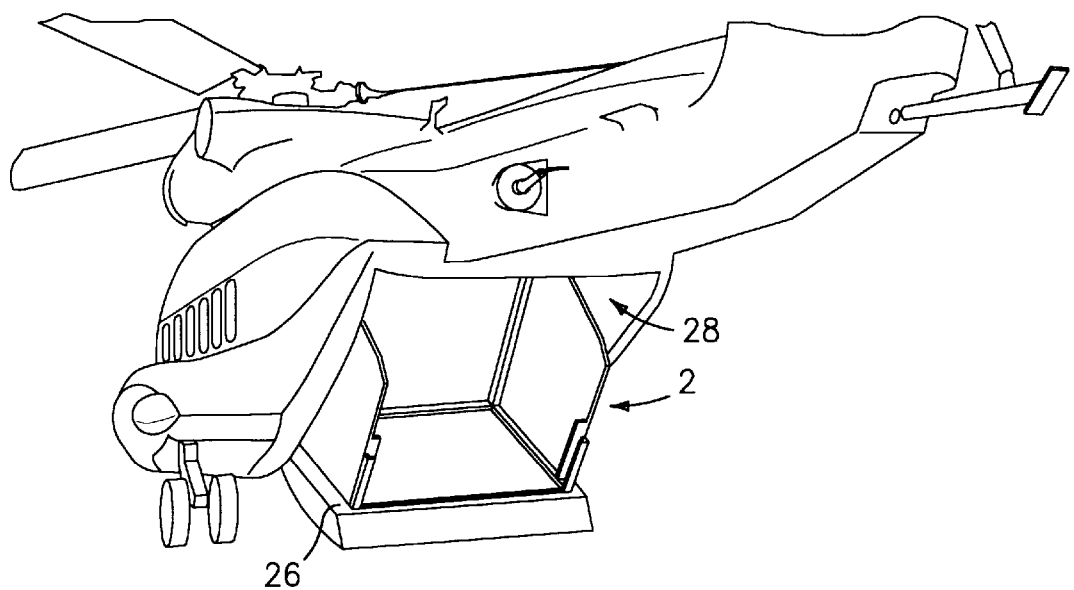
FIG. 4 is a perspective view similar to FIG. 3, but showing the back wall of the bin removed from the bin so as to open the entire back of the bin for cargo loading.
Figure 5:
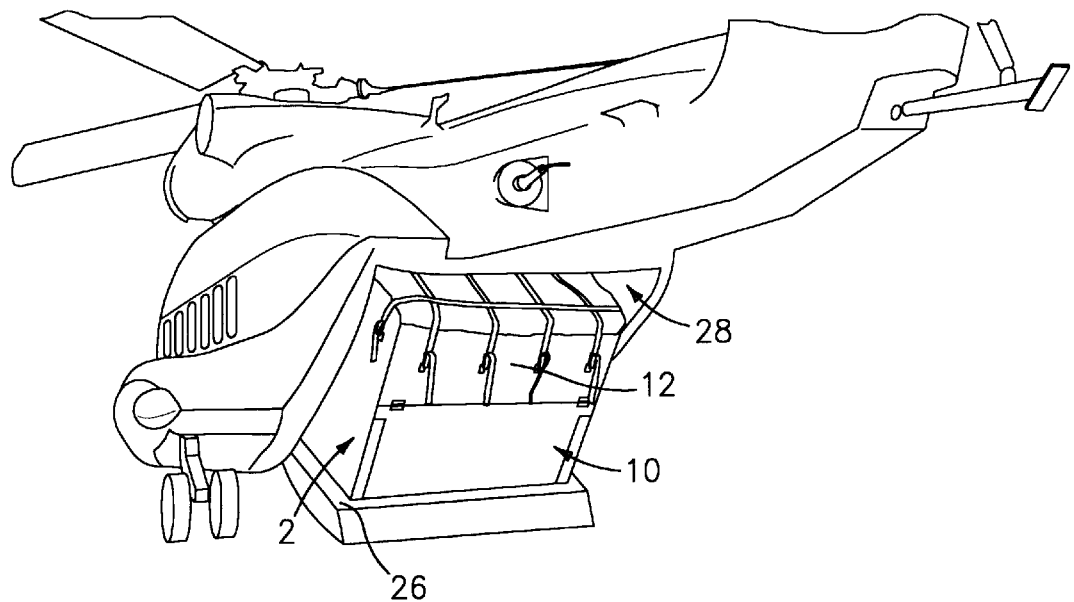
FIG. 5 is a perspective view similar to FIG. 4, but showing the bin closed up, and positioned on the cargo hold ramp of the helicopter.

FIG. 2 shows the bin 2 after it has been placed on the loading ramp 26 of the cargo hold 28 of a helicopter H. The cargo hold loading ramp 26 can pivoted down from its closed position to a first loading position which is shown in FIG. 2. The bin 2, once placed on the cargo hold loading ramp 26, can be pushed up into the cargo hold 28 to the position shown in FIG. 3. It will be noted that the top cover 12 of the bin 2 has been peeled or folded forwardly so that the bin 2 is open for the reception of cargo. With the back wall 10 adjusted to the configuration shown in FIG. 3, small pieces of cargo such as luggage can be put into the bin through the open upper half 20 of the back wall 10, and will be held in place in the bin 2 by the closed lower half 22 of the back wall 10. If necessary, the entire back wall 10 can be removed from the bin 2 so as to open the entire back of the bin 2 as shown in FIG. 4. This will allow cargo as large as fifty gallon drums, or the like, to be placed in the bin 2 when the latter is positioned on the loading ramp 26. Wedge-shaped tracks 27 are pivoted to the ramp 26 so as to facilitate sliding of the bin 2 up onto the ramp 26. Once the bin 2 is filled with cargo, the back wall 10 is closed and the top cover 12 is drawn over the cargo and strapped in place, as shown in FIG. 5. The filled bin 2 is then lifted up into the cargo hold 28 by hydraulically raising the loading ramp 26 of the hold 28. This closes the cargo hold 28 with the filled bin 2 disposed therein.

Figure 6:
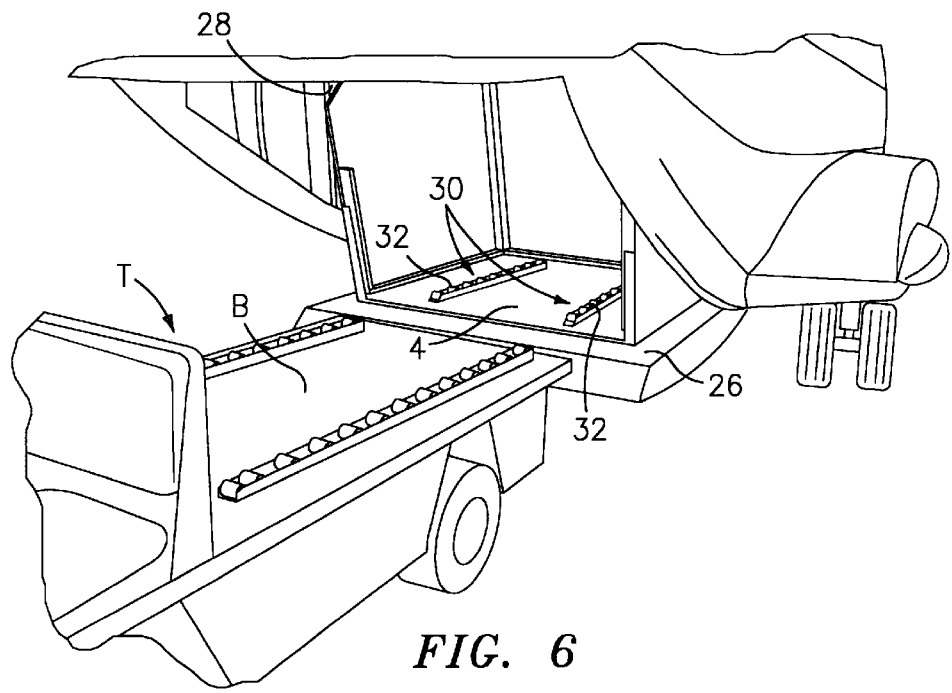
FIG. 6 is a perspective view similar to FIG. 3 showing the back wall of the bin removed from the bin, with the loading ramp of the helicopter cargo hold in a horizontal position, and wherein the cargo bin is equipped with cargo rollers which are rotatably journaled on the inside of the floor of the bin.

Referring now to FIG. 6, there is shown a modified embodiment of the bin 2 which is positioned on the loading ramp 26 of the helicopter cargo hold 28, the loading ramp 26 being raised to a horizontal position so as to position the bottom wall 4 of the bin 2 horizontally. The inside surface of the floor 4 of the bin 2 is provided with two parallel rows 30 of rotatable rollers or balls 32. The inclusion of the rollers 32 allows one person to slide heavy cargo, carried on pallets or the like, off of the bed B of a loading truck T and into the bin 2 without requiring the assistance of another person, and without risking bodily injury from the heavy cargo. Once the heavy cargo is slid into the bin 2, the back wall 10 is replaced, and the cover 12 is secured on the bin 2. The cargo hold loading ramp 26 is then hydraulically raised and locked in its closed position to close the cargo hold 28.

Figure 7:
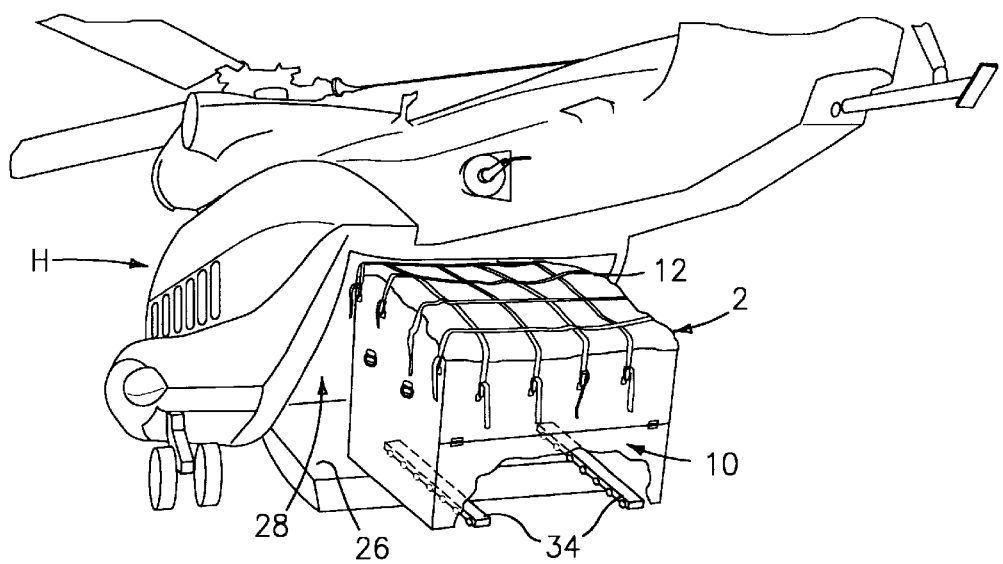
FIG. 7 is a view similar to FIG. 2 but showing the inclusion of sets of rollers mounted on the outside surface of the floor of the bin.

FIG. 7 shows an embodiment of the invention wherein sets 34 of rollers are disposed on the outside surface of the floor 4 of the bin 2 so as to simplify pushing of a cargo-filled bin 2 up onto the ramp 26 of the cargo hold of the aircraft.

It will be readily appreciated that the cargo bin assembly of this invention can be placed in the cargo hold of a helicopter, can be filled with cargo, closed, and secured in the cargo hold by a single person without the need of additional assistance. The matching configuration of the bin and cargo hold enables efficient use of the entire cargo hold space on the helicopter. The compound back wall of the bin enables the bin to accept both smaller items of cargo and larger items. The soft top of the bin enables one to easily close the top of the bin after it has been filled with cargo, and while it rests on the cargo hold loading ramp, ready to be lifted into the cargo hold for transport. The provision of rollers on the inside of the floor of the bin enables one to single handedly load the bin with heavy palletized cargo by simply sliding the cargo into the bin when the latter is positioned on the cargo hold loading ramp of the helicopter; and the provision of rollers on the outside of the floor of the bin enable one to single handedly push a loaded cargo bin onto the loading ramp of the aircraft.

Since many changes and variations of the disclosed embodiments of this invention may be made without departing from the inventive concept, it is not intended to limit the invention otherwise than as required by the appended claims.

What is claimed is:

1. An aircraft cargo bin assembly which is sized and configured so as to closely match the size and configuration of an aircraft cargo hold, so as to maximize the cargo-holding capacity of the aircraft cargo hold, said bin assembly comprising:

a) a rigid floor, rigid side walls which are connected to said floor, and a rigid front wall which is connected to said side walls and to said floor;

b) a cargo-loading back wall which is removably connected to said side walls and said floor, said back wall having an upper portion which is hinged to a lower portion of said back wall whereby said back wall of said bin assembly can be partially opened, or completely disconnected from said side walls and said floor of the bin assembly;

c) a flexible top cover on said bin assembly, said top cover being releasably connected to said back and side walls of said bin assembly, and said top cover being foldable away from said back wall of said bin assembly so as to open the top of said bin assembly; and d) selectively adjustable mechanisms which are operable to secure edges of said top cover to the back and side walls of the bin assembly after the latter has been filled with cargo.

2. The cargo bin assembly of claim 1 wherein only said lower portion of said back wall is slidably received in a pair of opposed channels which are secured to said side walls of the bin assembly.

3. The cargo bin assembly of claim 1 further comprising a plurality of rolling mechanisms mounted on an inside surface of the floor of said bin assembly, said rolling mechanisms being operable to facilitate sliding movement of heavy cargo onto the floor of said bin assembly.

4. The cargo bin assembly of claim 1 wherein said top cover is formed from a flame retardant fabric material.

5. The cargo bin assembly of claim 1 further comprising a plurality of rolling mechanisms mounted on an outside surface of the floor of said bin assembly, said rolling mechanisms being operable to facilitate sliding movement of a filled cargo bin assembly into the aircraft cargo hold.

\* \* \* \* \*